July 16, 1940.     J. E. HELD     2,208,369

SURGICAL STONE CRUSHER

Original Filed April 25, 1936

INVENTOR
Joseph E. Held
BY
ATTORNEYS

Patented July 16, 1940

2,208,369

UNITED STATES PATENT OFFICE

2,208,369

SURGICAL STONE CRUSHER

Joseph E. Held, Woodside, Long Island, N. Y., assignor to American Cystoscope Makers, Inc., New York, N. Y., a corporation of New York Original application April 25, 1936, Serial No. 76,331. Divided and this application February 12, 1938, Serial No. 190,189

4 Claims. (Cl. 128—319)

My present invention relates generally to surgical instruments, and has particular reference to the type of instrument in which a movable element is mounted for reciprocatory movement relative to a stationary part, as in the case of a surgical stone crusher.

This application is a division of my copending application for patent, filed April 25, 1936, Serial Number 76,331, now Patent No. 2,146,954.

A general object of the invention is to provide an improved means for effecting the reciprocating movements of the movable part of the instrument which, in the case of a surgical stone crusher, comprises a movable jaw.

In carrying out my invention, I resort to the use of a pair of scissors-handles which are adapted to be grasped by the surgeon in the same way as he would grasp an ordinary pair of scissors. In accordance with my invention, one of the scissors-handles is fixedly associated with the stationary part of the instrument, i. e., with the fixed jaws; the other scissors handle being provided with a gear segment which engages with a rack mounted on the movable jaw.

One of the features of my invention lies in providing an indicating device which is associated with the scissors-handles and which is adapted to indicate the extent of relative reciprocatory movement of the jaws.

A further feature of my invention lies in the provision of a conduit which may be used simultaneously as an irrigation conduit and as a tube for accommodating a telescope. The rear end of the conduit may, if desired, be entirely sealed when the telescope is removed, so that the conduit may be used exclusively for irrigation purposes. On the other hand, the conduit is oversized with respect to the telescope which it accommodates, so that, if desired, it may be used for irrigation purposes even while the telescope is in position.

I achieve the foregoing objects, and such other objects as may hereinafter appear or be pointed out, in the manner illustratively exemplified in the accompanying drawing, wherein—

Figure 1:
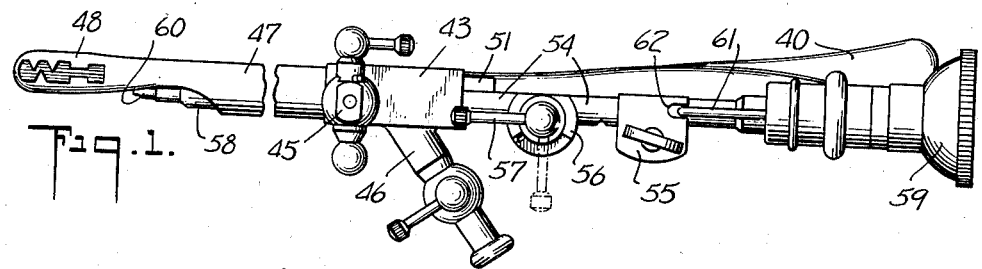
Figure 1 is a top view of a surgical stone crusher, showing the manner in which my invention is applied thereto, and being broken away for the sake of compactness.

In accordance with my invention, a pair of complementary scissors-handles 40 and 41 are pivoted together at the pivot axis 42. One of the handles is relatively fixed, while the other is movable; and in the illustrated embodiment it is the handle 41 which is movable between the full-line and the dot-and-dash line positions of Figure 2.

The fixed handle 40 is rigidly secured to a block 43 forming a portion of the relatively stationary part of the instrument. That is, projecting forwardly from the block 43 is a fixed stem 47 which carries a fixed transverse crushing jaw 48 at its forward end.

For a purpose presently to be described, a gear segment 44 is mounted on the upper portion of the movable scissors-handle 41. The center of curvature of the gear segment coincides with the pivot axis 42. The block 43 is provided with a slot or channel which freely accommodates the gear segment 44.

Movably associated with the relatively fixed stem 47 is a movable stem 49 constituting the movable part of the instrument. At its forward end it rigidly carries the complementary transverse crushing jaw 50; and at its rear end it carries the rack 51 which meshes with the gear segment 44. In this way, movement of the scissors-handle 41 from the dot-and-dash position of Figure 2 to the full-line position effects an advancement of the movable stem 49 and of the jaw 50 from the dot-and-dash position of Figure 2 to the fully closed position.

The block 43 is provided with at least one irrigation outlet or petcock, and I have illustratively shown the preferred construction in which an outlet 45 extends upwardly, while a somewhat larger outlet 46 extends laterally.

The block 43 is also provided with the fixed indicator plate or dial 52, while the movable handle 41 carries the pointer 53 which is adapted to move over the plate 52. The position of the pointer 53 on the scale 52 indicates to the operator the relative position of the movable crushing jaw. For example, with the parts in the full-line position of Figure 2, the two jaws 48 and 50 are in fully closed relationship and the pointer 53 is, therefore, positioned over the designation "Closed" on the plate 52. As the movable jaw 50 is withdrawn from the fixed jaw 48, by virtue of the manipulation of the scissors-handles, the pointer 53 moves over the dial 52. The latter is preferably provided with markings arranged to indicate the distance between the jaws in millimeters, thus permitting the operator to determine the size of a stone before the crushing operation, and permitting him also to make sure that the jaws are in fully closed relationship after the crushing procedure.

Figure 4:
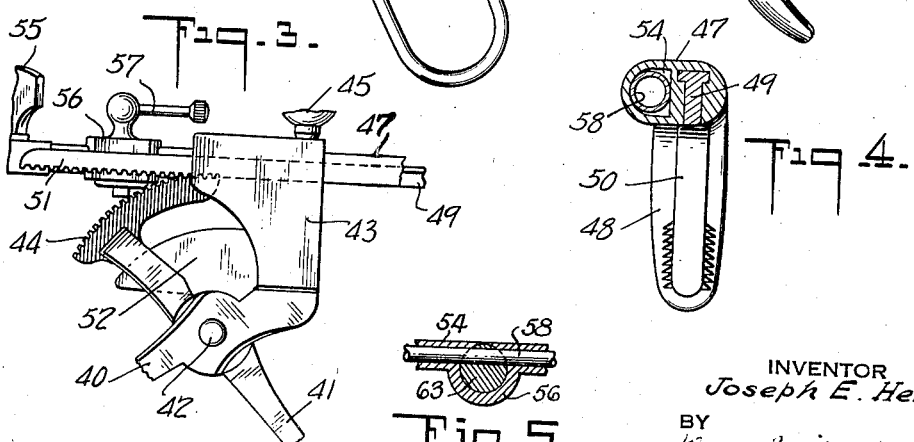
Figure 4 is an enlarged cross-sectional view taken substantially along the line 4—4 of Figure 2.

The main portion of the fixed stem 47 is provided with a longitudinal T slot, as shown most clearly in Figure 4, and the movable stem 49 is correspondingly shaped so that it is guided in its movement relative to the stem 47. Conjointly, the stems 47 and 49 constitute a single stem projecting forwardly from the rear portion of the instrument, a pair of complementary transverse crushing jaws being mounted at the forward end of this conjoint stem.

Figure 2:
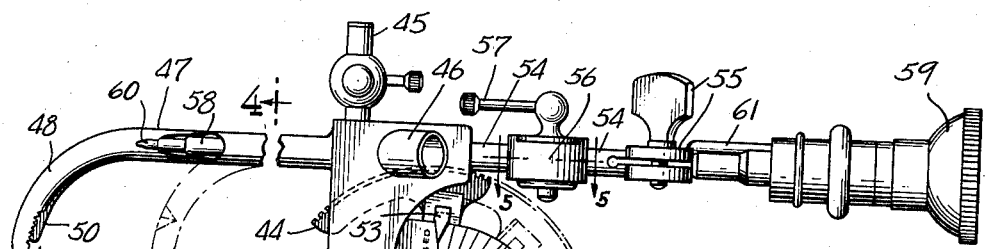
Figure 2 is a side view of the instrument of Figure 1.
Figure 3:
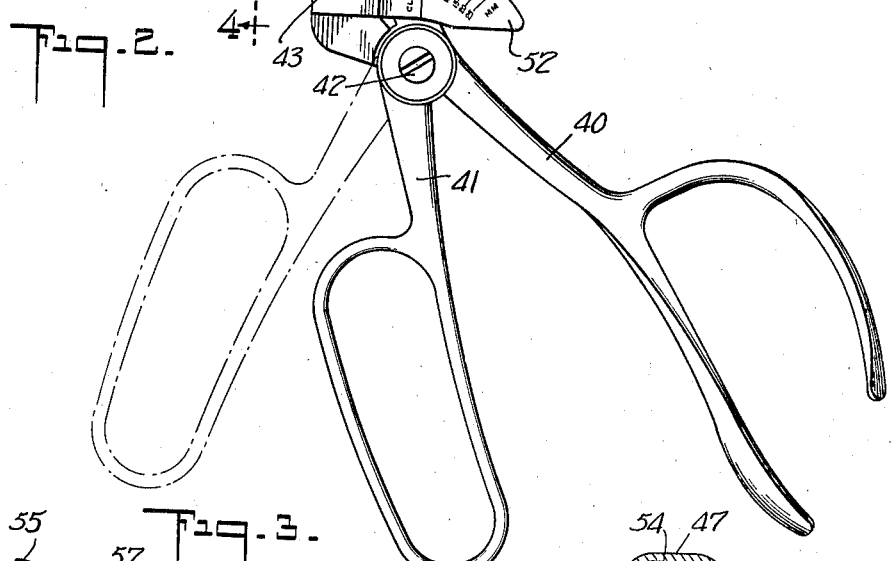
Figure 3 is a fragmentary elevational view of the rear portion of the instrument of Figure 2, shown from the opposite side.
Figure 5:
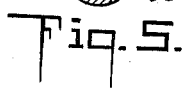
Figure 5 is a cross-sectional view taken substantially along the line 5—5 of Figure 2.

A lateral portion of the fixed stem 47 is hollowed out to provide a conduit 54, most clearly illustrated in Figure 4. This conduit communicates with an aligned bore extending through the block 43, and the conduit continues rearwardly of the block 43, as indicated in Figures 1 and 2. At its rear end, the conduit is provided with a clamp 55, and just in front of the clamp 55 is a valve device 56, including a rotatable plug element which is controlled by the handle 57. When the handle 57 is in the longitudinal position shown in full-lines in the drawing, a longitudinal bore in the plug element 63 is aligned with the conduit 54 and forms a portion thereof. Accordingly, a telescope tube 58 may be longitudinally disposed within the conduit 54, as shown in the drawing, particularly Figure 5. This telescope may be of any suitable construction, having the usual eyepiece 59 at its rear end and provided with a lamp 60 at its forward end, and with an objective which commands a view of the operative range of the crushing jaws.

When the telescope is fully inserted, a pin 61 carried thereby engages within the slot 62 in the clamping device 55; and the forward portion of the telescope protrudes by a slight amount from the forward open end of the conduit 54. The pin 61 assures a proper disposition of the telescope so that the objective will be facing in the correct direction so as to command the desired view of the operative range of the jaws.

The conduit 54 is slightly oversized with respect to the telescope tube, so that the petcocks 45 and 46 may be used during the crushing procedure to irrigate the region of operation. When a stone has been completely crushed, it is desirable to permit the fragments to be flushed out of the body through as large a passageway as possible. Accordingly, the present invention provides for the complete rearward withdrawal of the telescope so that the conduit 54 may be utilized to its fullest extent for flushing purposes. With this object in view, the valve device 56 is provided, the manipulation of the plug element 63, by swinging the handle 57 into the dot-and-dash position of Figure 1, serving to plug and seal the rear end of the conduit 54 after the telescope has been withdrawn.

When the petcocks 45 and 46 are used for irrigation, the petcock 46 is closed, and the irrigating fluid is introduced through the petcock 45. This petcock is then closed, and the petcock 46 is opened, allowing the fluid to drain and to carry with it the particles of the stone that has been crushed. This operation can be repeated as often as is necessary.

It will be understood that the structural improvements involving the conduit 54, the irrigation outlets connected with it, and the valve device 56, are phases of the invention independent of the means whereby the movable jaw is reciprocated.

The characterizing improvements of the surgical stone crusher herein illustrated, as compared with instruments of more conventional type, reside in the gear segment 44, the manner in which this gear segment cooperates with the rack 51, and the construction and arrangement of parts whereby the jaws are thus under the accurate control of a pair of scissors-handles, while illuminated visibility of the jaws is maintained.

As a result of the gear segment 44, improved operation is achieved by virtue of the fact that the actuating force is always applied to the movable stem 49 at a point directly above the pivot axis 42 throughout the entire manipulation of the scissors-handles. Accordingly, a uniform and more controllable force may be applied to the movable jaw throughout its entire operative stroke.

Moreover, it will be observed that both of the scissors-handles extend in a substantially transverse direction, thereby leaving the eyepiece of the telescope accessible at all times.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative and not in a limiting sense.

Having thus described my invention, and illustrated its use, what I claim as new and desire to secure by Letters Patent is:

1. In a surgical stone crusher, relatively movable stems with complementary crushing jaws at their forward ends, a conduit paralleling said stems and having an open front end adjacent to said jaws, a telescope removably insertable into the conduit through the rear end thereof, at least one lateral irrigation outlet near said rear end, and a valve for sealing the rear end of the conduit so that it may be used solely for irrigation purposes when the telescope is removed, said valve comprising a movable plug element having a bore adapted to align with and form part of said conduit when the telescope is inserted.

2. In a surgical instrument of the character described, a stationary part, a tool mounted for reciprocatory movement relative thereto, a pair of pivoted scissors-handles one of which is rigidly secured to the stationary part of the instrument, a rack on said tool, a gear segment carried by the movable scissors-handle and meshing with said rack, and relatively movable indicators carried by the scissors-handles, respectively, for indicating the extent of reciprocatory movement of the tool relative to the stationary part, one of said indicators being a dial carried by one of the scissors-handles, the other indicator being carried by the other scissors-handle.

3. In a surgical instrument of the character described, a stationary part, a tool mounted for reciprocatory movement relative thereto, a pair of pivoted scissors-handles one of which is rigidly secured to the stationary part of the instrument, a rack on said tool, a gear segment carried by the movable scissors-handle and meshing with said rack, and relatively movable indicators carried by the scissors-handles, respectively, for indicating the extent of reciprocatory movement of the tool relative to the stationary part, one of said indicators being an arcuate dial carried by one of the scissors-handles, the other indicator being a pointer carried by the other scissors-handle.

4. In a surgical stone crusher, a fixed stem having a longitudinal bore laterally displaced from the longitudinal axis of said stem, said stem having a longitudinal guide slot formed in the unbored portion, a movable stem mounted in said slot for guided longitudinal movement relative to the fixed stem, complementary transverse crushing jaws rigidly arranged on the forward ends of said stems respectively, a telescope removably insertable into said bore through the rear end thereof, said bore having an open front end behind said jaws to allow the telescope to include said jaws within its field of vision, the cross-sectional area of said bore being greater than that of the telescope to permit the bore to serve as an irrigation conduit, and a valve for sealing the rear end of the conduit when the telescope is removed, said valve comprising a movable plug element having a bore adapted to align with and form part of said conduit when the telescope is inserted.

JOSEPH. E. HELD.